(12) United States Patent
Courtney

(10) Patent No.: US 12,465,396 B2
(45) Date of Patent: Nov. 11, 2025

(54) MINIMALLY INVASIVE SPINAL INSTRUMENT AND METHOD FOR USE OF SAME

(71) Applicant: Eminent Spine LLC, Plano, TX (US)

(72) Inventor: Stephen Courtney, Plano, TX (US)

(73) Assignee: Eminent Spine LLC, Plano, TX (US)

( * ) Notice: Subject to any disclaimer, the term of this patent is extended or adjusted under 35 U.S.C. 154(b) by 0 days.

(21) Appl. No.: 17/720,696

(22) Filed: Apr. 14, 2022

(65) Prior Publication Data

US 2022/0330974 A1 Oct. 20, 2022

Related U.S. Application Data

(60) Provisional application No. 63/174,580, filed on Apr. 14, 2021.

(51) Int. Cl.
*A61B 17/34* (2006.01)
*A61B 17/00* (2006.01)
(Continued)

(52) U.S. Cl.
CPC .... *A61B 17/3421* (2013.01); *A61B 17/00234* (2013.01); *A61B 17/3209* (2013.01); *A61B 17/7002* (2013.01); *A61B 17/7032* (2013.01); *A61B 17/7083* (2013.01); *A61B 2010/0258* (2013.01); *A61B 2017/0256* (2013.01);
(Continued)

(58) Field of Classification Search
CPC .......... A61B 17/00234; A61B 17/3421; A61B 17/7074; A61B 17/7076; A61B 17/7083; A61B 17/1757; A61B 17/34; A61B 17/3403; A61B 17/3417; A61B 17/70; A61B 17/1604; A61B 17/1671; A61B 17/848; A61B 17/8897; A61B 17/1697; A61B 17/3468; A61B 17/3472; A61B 2017/922; A61B 2017/3443; A61B 2017/3445; A61B 2017/3447; A61B 17/1756

See application file for complete search history.

(56) References Cited

U.S. PATENT DOCUMENTS 4,469,109 A 9/1984 Mehl
5,368,046 A 11/1994 Scarfone et al.
(Continued)

*Primary Examiner* — Julianna N Harvey
*Assistant Examiner* — Anna V. Little
(74) *Attorney, Agent, or Firm* — Scott Griggs; Griggs Bergen LLP

(57) ABSTRACT

A minimally invasive spinal instrument and method for use of the same are disclosed. In some embodiments, a body includes an outer shaft and an inner shaft. A passageway accepts the inner shaft such that the outer shaft at least partially encloses the inner shaft. Each of the outer shaft and the inner shaft have spaced rings with locking grooves interleaved therewith. Each set of locking grooves is sized to accept a clamp such that the spaced rings mitigate longitudinal sliding of the clamp. A locking knob selectively secures the outer shaft and inner shaft thereto. A tip is removably secured to the inner shaft. In a single shaft configuration, in response to the locking knob being selectively disengaged from the outer shaft, the inner shaft and the locking knob are separated from the outer shaft such that the passageway is accessible to accept a metallic wire therethrough.

16 Claims, 11 Drawing Sheets

(51) Int. Cl.
*A61B 17/02* (2006.01)
*A61B 17/3209* (2006.01)
*A61B 17/70* (2006.01)
*A61B 10/02* (2006.01)
*A61B 17/22* (2006.01)

(52) U.S. Cl.
CPC ............... *A61B 2017/22038* (2013.01); *A61B 2017/3443* (2013.01)

(56) References Cited

U.S. PATENT DOCUMENTS

| | | | |
|---|---|---|---|
| 5,458,579 A | 10/1995 | Chodorow et al. | |
| 6,582,439 B1 * | 6/2003 | Sproul | A61B 8/12 606/86 R |
| 7,179,244 B2 | 2/2007 | Smith et al. | |
| 7,399,294 B2 | 7/2008 | Mickley | |
| 7,476,240 B2 | 1/2009 | Raymond et al. | |
| 8,221,358 B2 | 7/2012 | McKay | |
| 8,758,383 B2 | 6/2014 | Geist | |
| 11,116,553 B2 | 9/2021 | Gephart et al. | |
| 2003/0163062 A1 | 8/2003 | Bauer | |
| 2004/0077973 A1 | 4/2004 | Groenke et al. | |
| 2004/0260307 A1 * | 12/2004 | Zander | A61B 17/17 606/104 |
| 2005/0080418 A1 | 4/2005 | Simonson et al. | |
| 2005/0131421 A1 | 6/2005 | Anderson et al. | |
| 2007/0260255 A1 * | 11/2007 | Haddock | A61B 17/3472 606/184 |
| 2009/0149857 A1 * | 6/2009 | Culbert | A61B 1/0684 606/191 |
| 2010/0069843 A1 | 3/2010 | Allee et al. | |
| 2010/0211076 A1 * | 8/2010 | Germain | A61B 18/1492 606/84 |
| 2016/0278763 A1 * | 9/2016 | Beaven Md | A61B 17/0482 |
| 2017/0035483 A1 | 2/2017 | Crainich et al. | |
| 2019/0223890 A1 * | 7/2019 | Druma | A61B 17/1633 |
| 2019/0223930 A1 * | 7/2019 | Nolan | A61B 17/1615 |
| 2019/0255308 A1 * | 8/2019 | Virden | A61M 37/0069 |
| 2020/0268360 A1 * | 8/2020 | Pennie | A61B 10/025 |

\* cited by examiner

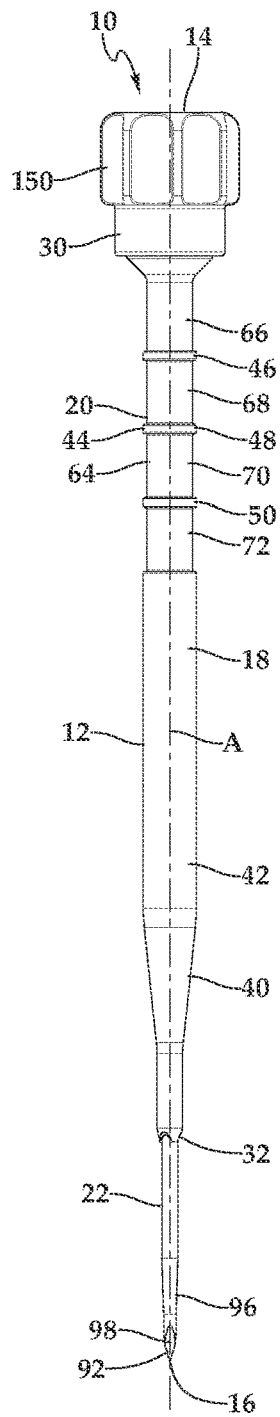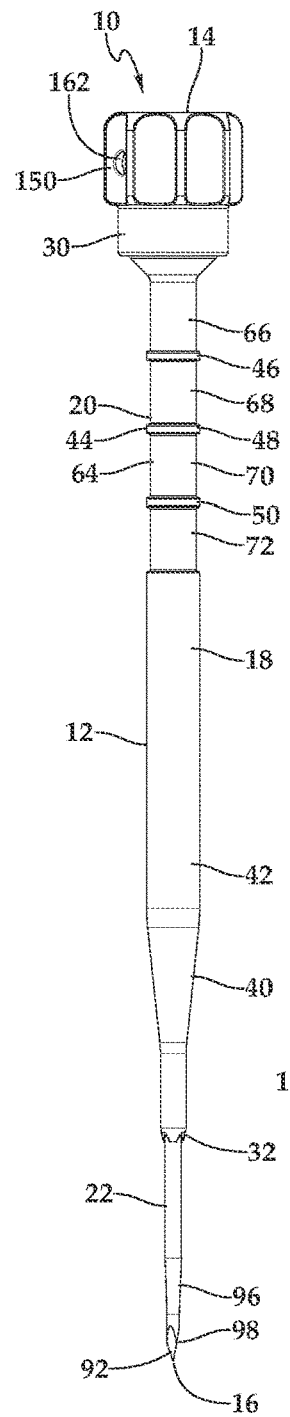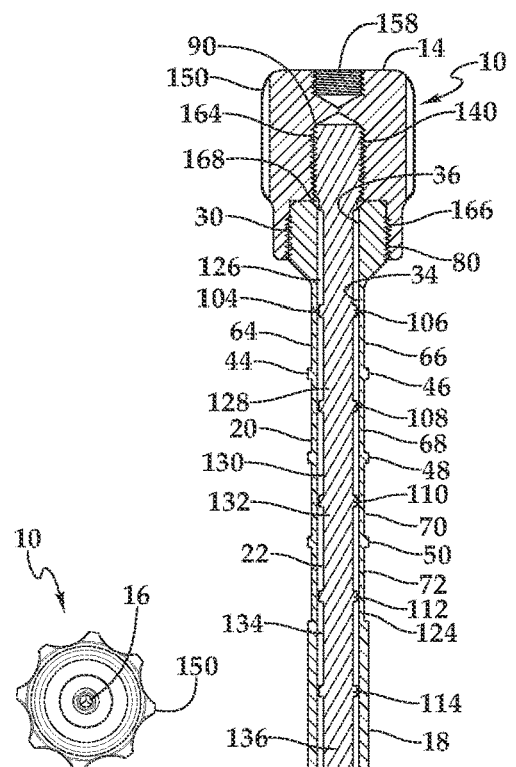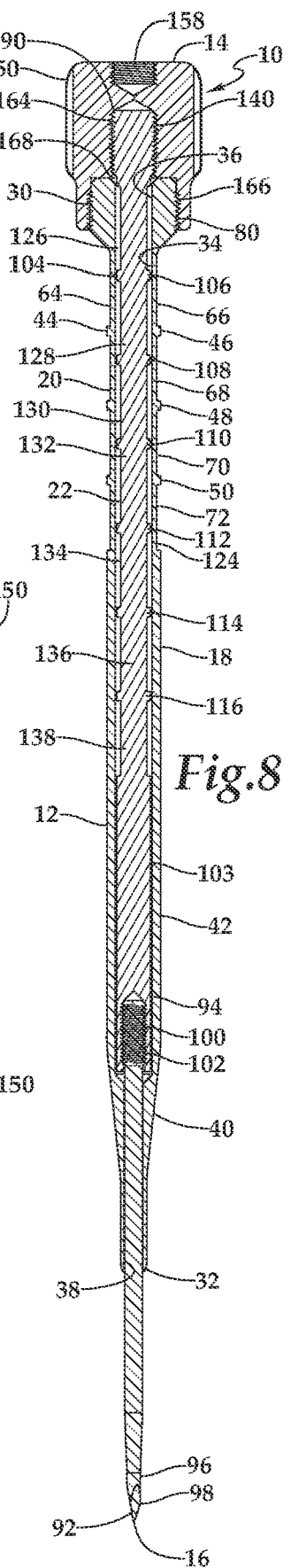

MINIMALLY INVASIVE SPINAL INSTRUMENT AND METHOD FOR USE OF SAME

PRIORITY STATEMENT & CROSS-REFERENCE TO RELATED APPLICATIONS

This application claims priority from U.S. patent application No. 63/174,580, entitled "Minimally Invasive Spinal Instrument and Method for Use of Same" and filed on Apr. 14, 2021, in the name of Stephen Courtney; which is hereby incorporated by reference, in entirety, for all purposes.

TECHNICAL FIELD OF THE INVENTION

This invention relates, in general, to the field of medical devices and, in particular, to a minimally invasive spinal instrument and a method for use of same, for minimally invasive spinal targeting techniques and screw placement at the lumbar spine as part of a pedicle screw fixation system.

BACKGROUND OF THE INVENTION

A large number of pedicle screw fixation systems for the spinal column are already known. Typically, a large Jamshidi needle, which was originally designed for use in bone marrow biopsies, or another tap is docked on the spine with the tip directly over the lateral border of a pedicle at the lumbar spine. Once the tip of the Jamshidi needle is docked, fluoroscopic confirmation of the location is obtained before placement is finalized. A narrow guidewire initially threaded through the Jamshidi needle is then utilized for pedicle screw placement with lateral fluoroscopy providing verification of guidewire depth and pedicle screw placement. The Jamshidi needles, while permitting the alignment of the pedicle screws, have proven themselves to lack the ergonomic form factor required during surgical procedures to achieve and maintain an accurate placement without unnecessarily causing hand cramping or exposing a hand or forearm to radiation during an imaging procedure. Accordingly, improvements are needed.

SUMMARY OF THE INVENTION

It would be advantageous to achieve minimally invasive spinal instruments and methods for use of the same. It would also be desirable to enable a medical-based solution that would provide an ergonomic form factor and allow a surgeon to maintain an accurate placement without unnecessarily causing hand cramping or exposing a hand or a forearm to radiation during an imaging procedure. To better address one or more of these concerns, in one aspect of the invention, a minimally invasive spinal instrument and a method for use of the same are disclosed. In some embodiments, a body includes an outer shaft and an inner shaft. The passageway is sized to accept the inner shaft such that the outer shaft at least partially encloses the inner shaft. Each of the outer shaft and the inner shaft have spaced rings with locking grooves interleaved therewith. Each set of locking grooves is sized to accept a clamp such that the spaced rings mitigate longitudinal sliding of the clamp. A locking knob selectively secures the outer shaft and inner shaft thereto. A tip is removably secured to the inner shaft. In a single shaft configuration, in response to the locking knob being selectively disengaged from the outer shaft, the inner shaft and the locking knob are separated from the outer shaft such that the passageway is accessible to accept a metallic wire therethrough. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 4 is a lateral view from a second viewpoint of the minimally invasive spinal instrument depicted in FIG. 1;

FIG. 5 is a lateral view from a third viewpoint of the minimally invasive spinal instrument depicted in FIG. 1;

FIG. 6 is a distal view of the minimally invasive spinal instrument depicted in FIG. 1;

FIG. 7 is a proximal view of the minimally invasive spinal instrument depicted in FIG. 1;

FIG. 8 is a cross-sectional view of the minimally invasive spinal instrument depicted in FIG. 1;

DETAILED DESCRIPTION OF THE INVENTION

Figure 1:
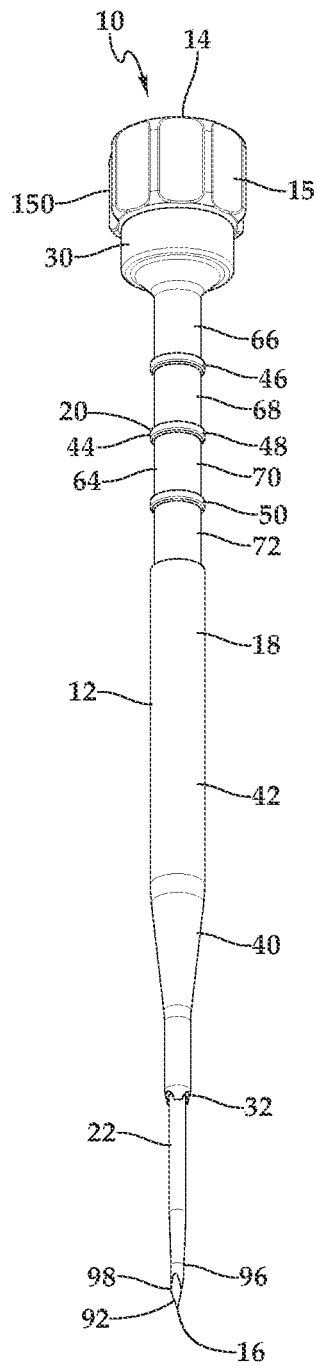
FIG. 1 is a perspective view from a distal angle of one embodiment of a minimally invasive spinal instrument including an outer shaft and an inner shaft, according to some teachings presented herein.
Figure 2:
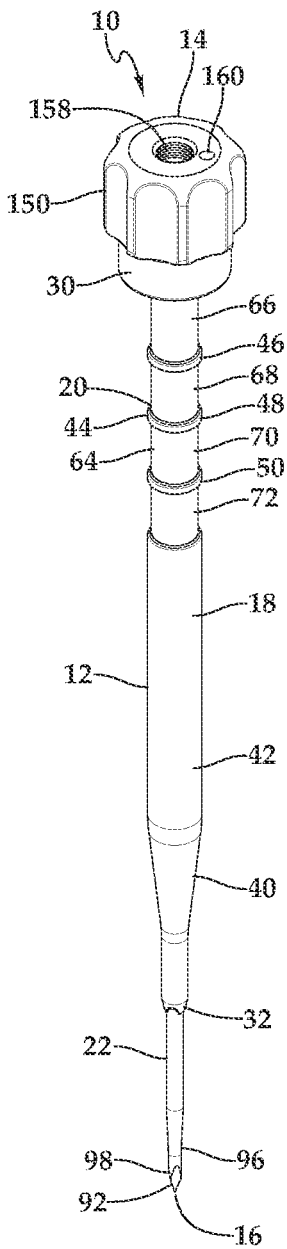
FIG. 2 is a perspective view from a proximal angle of the minimally invasive spinal instrument depicted in FIG. 1.
Figure 3:
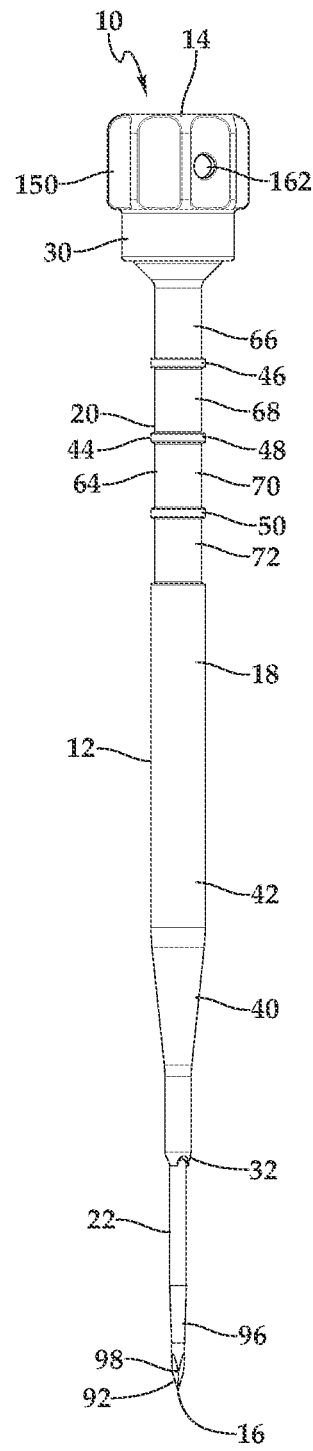
FIG. 3 is a lateral view from a first viewpoint of the minimally invasive spinal instrument depicted in FIG. 1.
Figure 9:
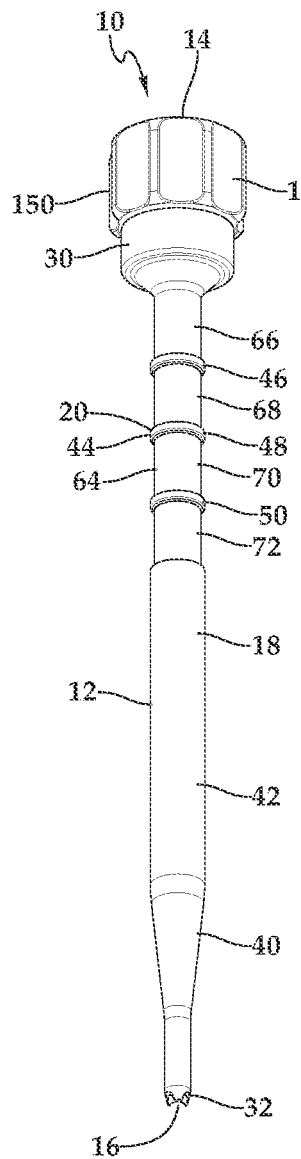
FIG. 9 is a perspective view from a distal angle of the outer shaft depicted in FIG. 1.
Figure 10:
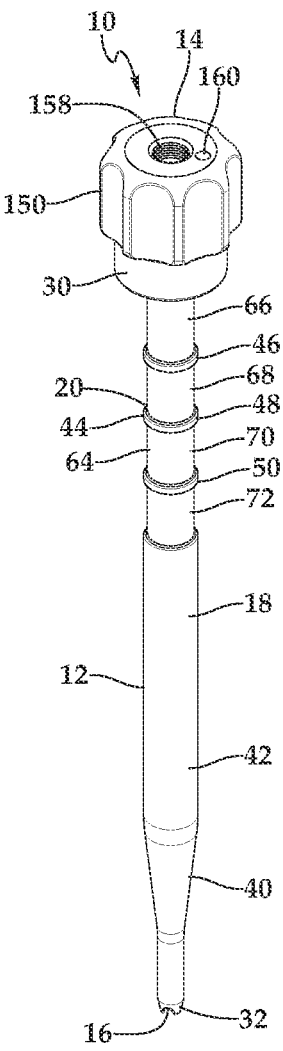
FIG. 10 is a perspective view from a proximal angle of the outer shaft depicted in FIG. 1.
Figure 11:
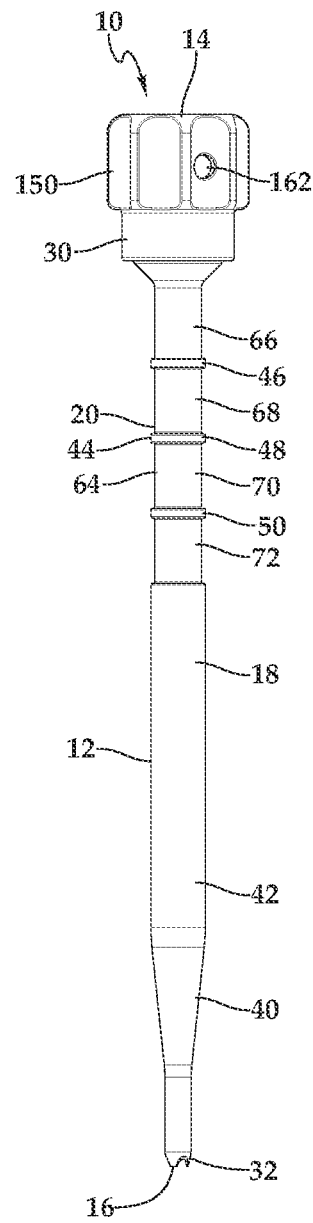
FIG. 11 is a lateral view from a first viewpoint of the outer shaft depicted in FIG. 1.
Figure 12:
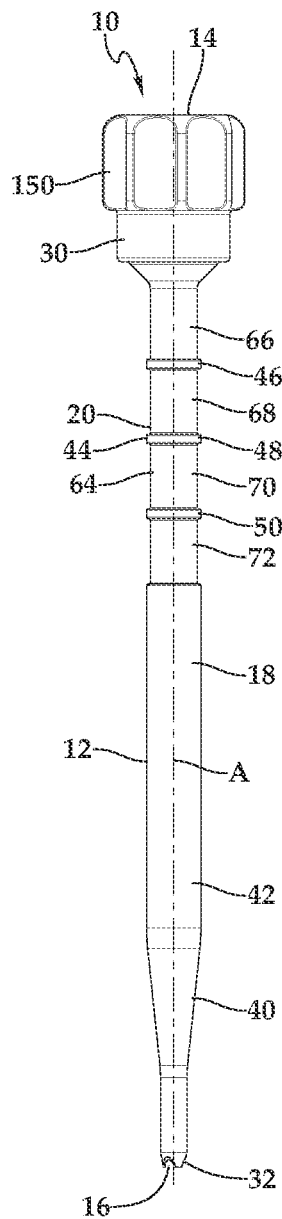
FIG. 12 is a lateral view from a second viewpoint of the outer shaft depicted in FIG. 1.
Figure 13:
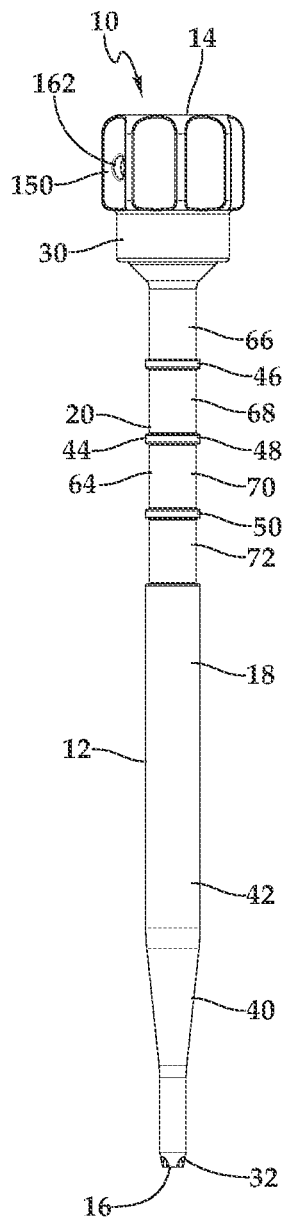
FIG. 13 is a lateral view from a third viewpoint of the outer shaft depicted in FIG. 1.
Figure 14:
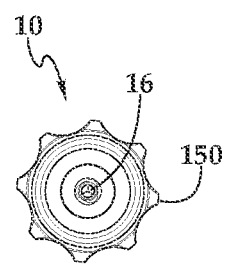
FIG. 14 is a distal view of the outer shaft depicted in FIG. 1.
Figure 15:
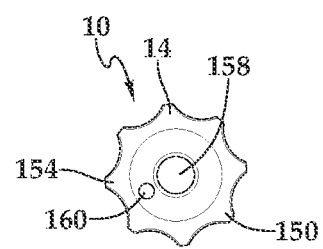
FIG. 15 is a proximal view of the outer shaft depicted in FIG. 1.
Figure 16:
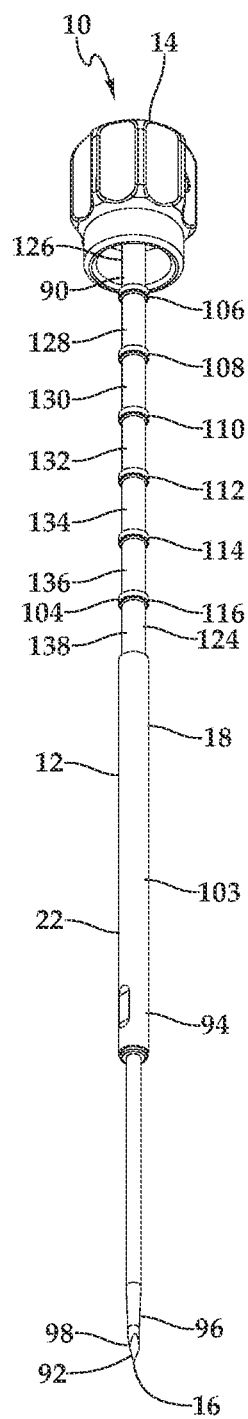
FIG. 16 is a perspective view from a distal angle of the inner shaft presented in FIG. 1.
Figure 17:
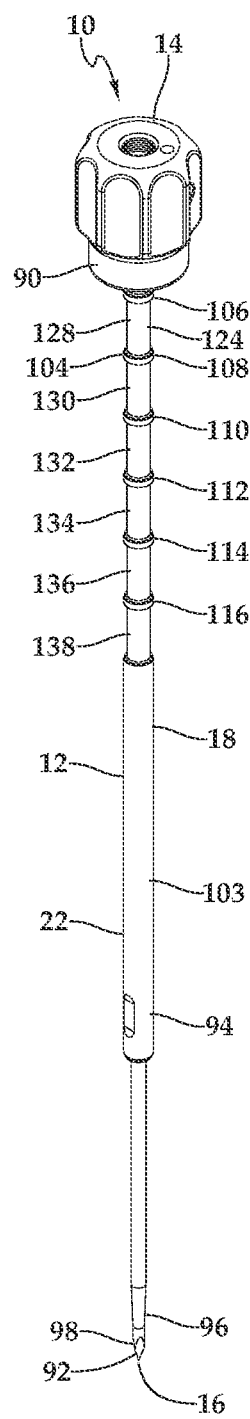
FIG. 17 is a perspective view from a proximal angle of the inner shaft presented in FIG. 1.
Figure 18:
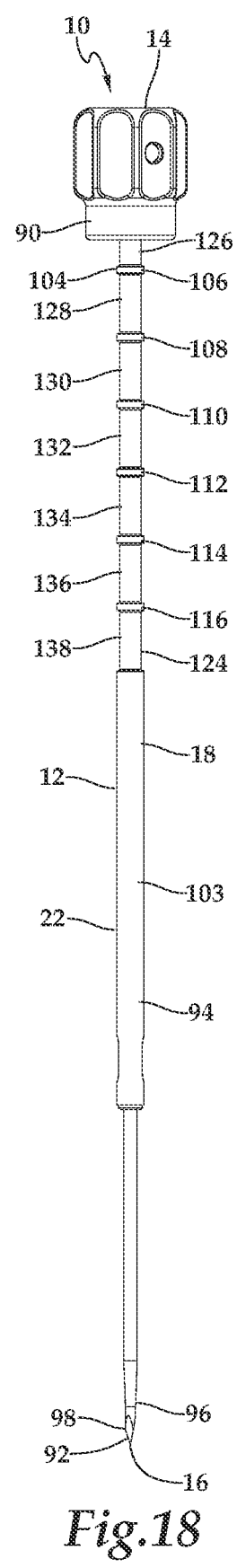
FIG. 18 is a lateral view from a first viewpoint of the inner shaft presented in FIG. 1.
Figure 19:
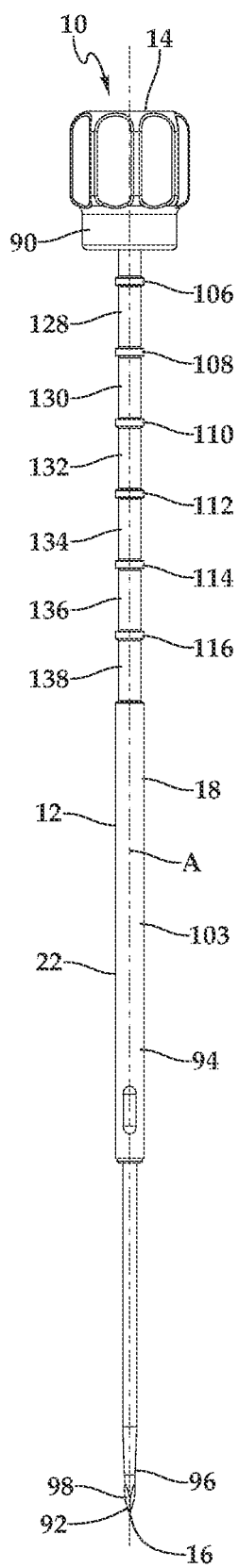
FIG. 19 is a lateral view from a second viewpoint of the inner shaft presented in FIG. 1.
Figure 20:
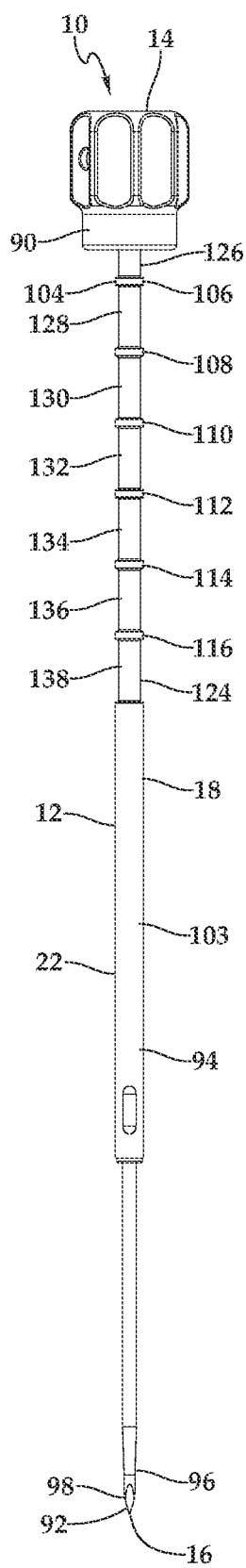
FIG. 20 is a lateral view from a third viewpoint of the inner shaft presented in FIG. 1.
Figure 21:
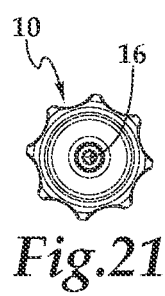
FIG. 21 is a distal view of the inner shaft presented in FIG. 1.
Figure 22:
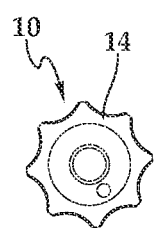
FIG. 22 is a proximal view of the inner shaft presented in FIG. 1.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1 through FIG. 22, therein is depicted one embodiment of a minimally invasive spinal instrument for minimally invasive spinal targeting techniques and screw placement that is schematically illustrated and generally designated 10. As shown in the illustrated embodiment, the minimally invasive spinal instrument 10 includes a body 12 having a longitudinal axis A with a proximal end region 14, a distal end region 16, and a medial region 18 therebetween. An outer shaft 20 and an inner shaft 22 form portions of the body 12. The outer shaft 20 includes ends 30, 32 with the end 30 being positioned at the proximal end region 14 of the body and the end 32 being positioned at the distal end region 16. The outer shaft 20 also has a passageway 34 therethrough from the end 30 to the end 32 with an opening 36 positioned at the end 30 and an opening 38 positioned at the end 32. The passageway 34 is sized to accept the inner shaft 22 such that the outer shaft 20 at least partially encloses, including fully enclosing, the inner shaft 22. As will be shown hereinbelow, the passageway 34 also has a size that accepts a metallic wire therethrough. In some implementations, the metallic wire may be a Kirschner wire (K-wire).

The outer shaft 20 includes a tapered end 40 at the end 32 within the distal end region 16 of the body 12. The tapered end 40 may be sized to interface with a tap hole in a bone, for example, as part of a minimally invasive spinal targeting technique and screw placement at the lumbar spine, which may form a portion of a pedicle screw fixation system. With respect to the medial region 18, the outer shaft 20 includes a barreled surface 42, which may be adjacent the tapered end 40. The barreled surface 42 provides an ergonomic interface for handling the minimally invasive spinal instrument 10.

With respect to the proximal end region 14 and the medial region 18, the outer shaft 20 includes spaced rings 44, which include individual spaced rings 46, 48, 50. Also, between the proximal end region 14 and the medial region 18, the outer shaft 20 includes locking grooves 64 interleaved with the spaced rings 44. More particular, the locking grooves 64 include individual locking grooves 66, 68, 70, 72. As will be discussed in further detail hereinbelow, the locking grooves 64 are sized to accept a clamp such that the spaced rings 44 mitigate longitudinal sliding of the clamp. By way of example and not by way of limitation, the clamp may be forceps or Kocher forceps. At the end 30 in the proximal end region 14, the outer shaft 20 includes threads 80.

As mentioned, the inner shaft 22 is sized to be at least partially enclosed within the passageway of the outer shaft 20. The inner shaft 22 includes ends 90, 92 with the end 90 being positioned at the proximal end region 14 of the body 12 and the end 92 being positioned at the distal end region 16. The inner shaft 22 includes a receiving member 94 at the end 92 within the distal end region 16 of the body 12. The receiving member 94 may be sized to interface with a tip 96, which may be a tip capable of making a tap hole in a bone, for example, as part of a minimally invasive spinal targeting technique and screw placement at the lumbar spine, which may form a portion of a pedicle screw fixation system. In one embodiment, the tip 96 may be a trocar tip 98 of the type including an awl and a cannula. In one implementation, the receiving member 94 includes threads 100 for receiving, in threaded engagement, the tip 96 thereat, which may include threads 102. Although threads 100 are presented, it should be appreciated that other connection techniques are within and included in the teachings presented herein.

With respect to the medial region 18, the inner shaft 22 includes a barreled surface 103, which may be adjacent the receiving member 94. The barreled surface 103 provides an ergonomic interface for handling the minimally invasive spinal instrument 10. With respect to the proximal end region 14 and the medial region 18, the inner shaft 22 includes spaced rings 104, which include individual spaced rings 106, 108, 110, 112, 114, 116. Also, between the proximal end region 14 and the medial region 18, the inner shaft 22 includes locking grooves 124 interleaved with the spaced rings 104. More particular, the locking grooves 124 include individual locking grooves 126, 128, 130, 132, 134, 136, 138. As will be discussed in further detail hereinbelow, the locking grooves 124 are sized to accept a clamp such that the spaced rings 104 mitigate longitudinal sliding of the clamp. As previously mentioned, by way of example and not by way of limitation, the clamp may be forceps or Kocher forceps. At the end 90 in the proximal end region 14, the inner shaft includes threads 140.

A locking knob 150 is selectively secured to the proximal end region 14 of the body 12. In one embodiment, the locking knob 150 includes a body 152 with a striking face 154 and a connection face 156. The striking face 154 is sized to accept a strike from a hammer, such as a mallet. An opening 158, which may or may not threaded, is positioned in the striking face 154 to provide an interface with other medical devices. An alignment marker 160 is also positioned on the striking face 154. In one embodiment, the connection face 156 includes an opening 162 providing access to central set of threads 164 configured to threadably engage the inner shaft 22 at the threads 140. The connection face 156 also has a peripheral set of threads 166 configured to threadably engage the outer shaft 20 at the threads 80. As shown, the peripheral set of threads 166 may be radially and longitudinally offset from the central set of threads 164. As further shown, the connection face 156 may include a shoulder 168, which spatially separates the central set of threads 164 and the peripheral set of threads 166. In this manner, the peripheral set of threads 166 are positioned distally to the central set of threads 164.

The minimally invasive spinal instrument 10 includes a double shaft configuration and two single shaft configurations. In the double shaft configuration, the locking knob engages each of the outer shaft and the inner shaft such that the inner shaft is enclosed in the outer shaft via the passageway. At the proximal end region, the locking knob is positioned to accept the strike from a hammer. At the distal end region, the tip extends from the body 12. In between the proximal end region and the distal end region, the spaced rings and locking grooves accept a clamp.

In the single shaft configuration which utilizes the outer shaft, in response to the locking knob being selectively disengaged from the outer shaft by disengaging the threads from the threads, the inner shaft and the locking knob are separated from the outer shaft such that the opening to the passageway is accessible to accept the metallic wire therethrough such that the metallic wire may exit the opening near the tapered end 40. The tapered end 40 may be sized to interface with a tap hole in a bone during threading and placement of the metallic wire. In between the proximal end region and the distal end region, the spaced rings and locking grooves of the outer shaft accept a clamp.

In the single shaft configuration which utilizes the inner shaft, in response to the locking knob being selectively disengaged from the outer shaft by disengaging the threads from the threads, the outer shaft is separated from the locking knob and the inner shaft. At the proximal end region, the locking knob is positioned to accept the strike from the hammer. At the distal end region, the tip extends from the body 12. In between the proximal end region and the distal end region, the spaced rings and locking grooves of the inner shaft accept a clamp.

Referring now to FIG. 23 through FIG. 25B, the minimally invasive spinal instrument 10 is well suited for use in various surgical procedures. By way of non-limiting example, the minimally invasive spinal instrument 10 is well suited towards minimally invasive spinal targeting techniques and screw placement at the lumbar spine as part of a pedicle screw fixation system implanted into a humane vertebral column. A vertebral pedicle is a dense stem-like structure that projects from the posterior of a vertebra. There are two pedicles per vertebra that connect to other structures such as lamina and vertebral arches. By way of example, the minimally invasive spinal instrument 10 may be utilized as part of a pedicle screw fixation system to correct deformity, treat trauma, or a combination thereof. Additionally, such pedicle screw fixation systems may be used in instrumentation processes to affix rods and plates to the spine or, alternatively, they may be used to immobilize part of the spine to assist fusion by holding bony structures together.

Figure 23:
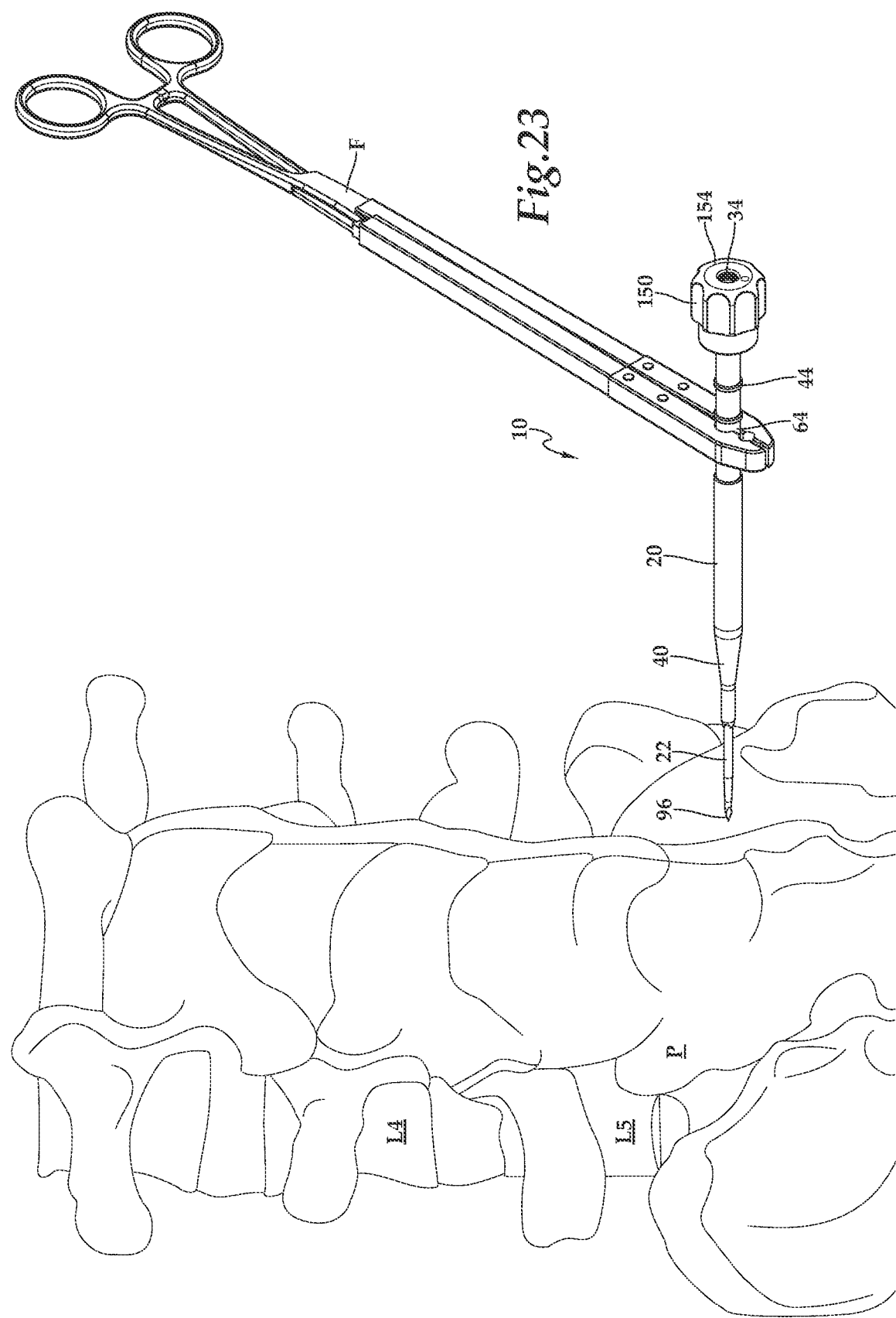
FIG. 23 is a front perspective view of one operational implementation of the minimally invasive spinal instrument being used in a first phase of a minimally invasive spinal targeting procedure.

As shown in FIG. 23, the pedicle screw fixation system, including the minimally invasive spinal instrument 10, is utilized at the small bony tube created by the pedicle, which is represented by the letter P, on each side of the vertebra, between the nerve roots. This allows the pedicle screw fixation system to grab into the bone of the vertebral body, furnishing a solid hold in the vertebra. By way of example, once the medical procedure is complete, rods, such as orthopedic rods, connect the pedicle screw fixation system together at two or more consecutive spine segments, such as lumbar segments 4 and 5 (shown as L4, L5). Obtaining true and accurate imaging, with appropriate parallel positioning to the vertebral body where pedicle fixation is desired, is paramount for successful placement of the pedicle screw fixation system.

As shown in FIG. 23, skin incisions for percutaneous pedicle screws are laterally positioned to the lateral wall of the pedicles. The minimally invasive spinal instrument 10 is introduced through the skin incision. As shown, Kocher forceps F hold the minimally invasive spinal instrument 10 by way of the locking grooves 64 which are sized to accept a clamp such that the spaced rings 44 mitigate longitudinal sliding of the clamp. In this manner, the minimally invasive spinal instrument 10 is positioned in a controlled and stable manner that permits the surgeon's hand and forearm to be clear of the imaging line-of-sight, thereby mitigating or eliminating low levels of radiation exposure.

As the Kocher forceps F hold the minimally invasive spinal instrument 10, the mallet gently taps against the striking face 154 of the locking knob 150 of the minimally invasive spinal instrument. The tip 96 is then slowly advanced into the lateral part of the pedicle until the tip 96 is docked on the spine with the tip 96 directly over the lateral border. Once the tip 96 is docked just inside of the cortex of the bone, imaging, such as fluoroscopic confirmation, of the location needs to be obtained prior to advancing it any deeper.

Figure 24:
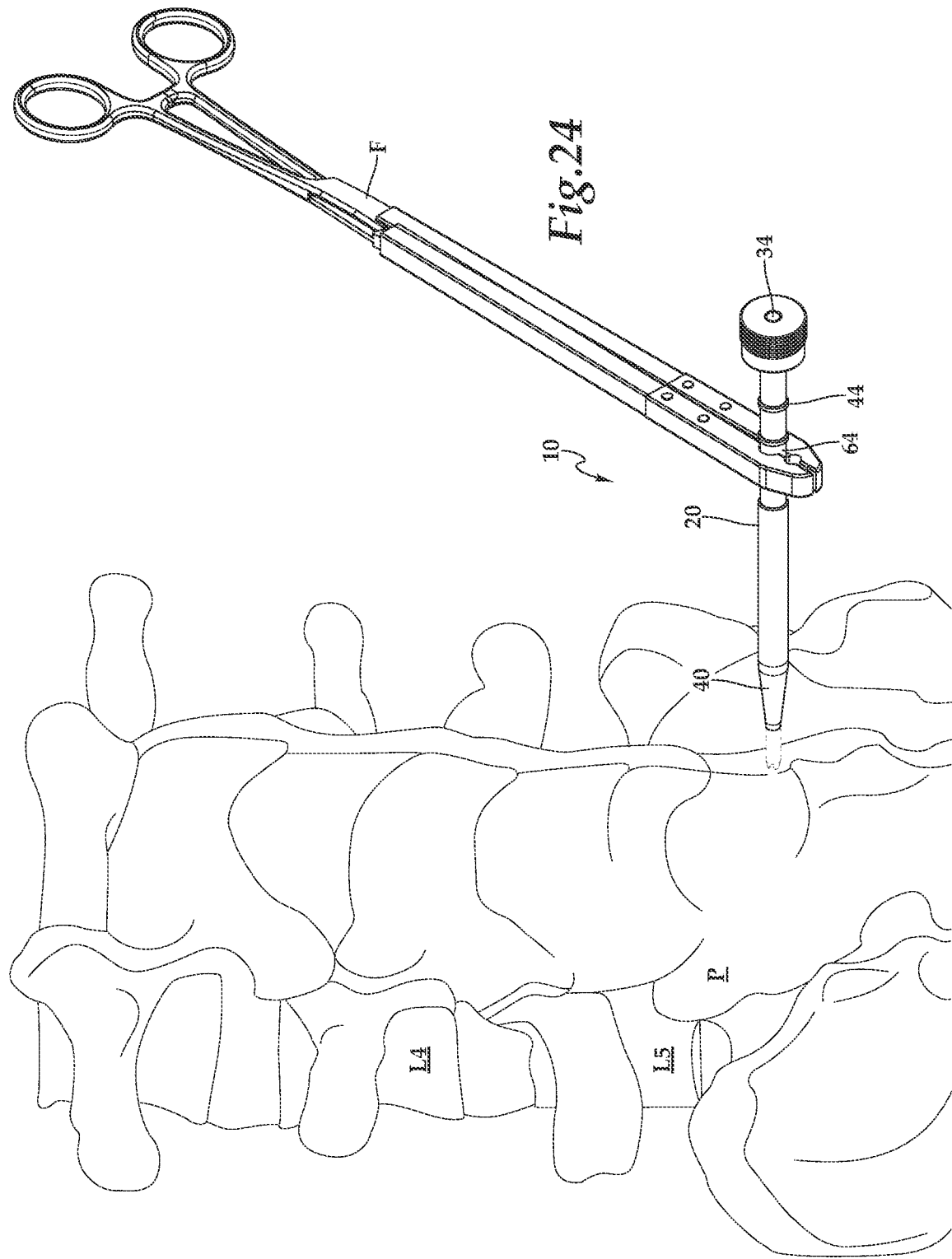
FIG. 24 is a front perspective view of one operational implementation of the minimally invasive spinal instrument being used in a second phase of the minimally invasive spinal targeting procedure shown in FIG. 23.
Figure 25:
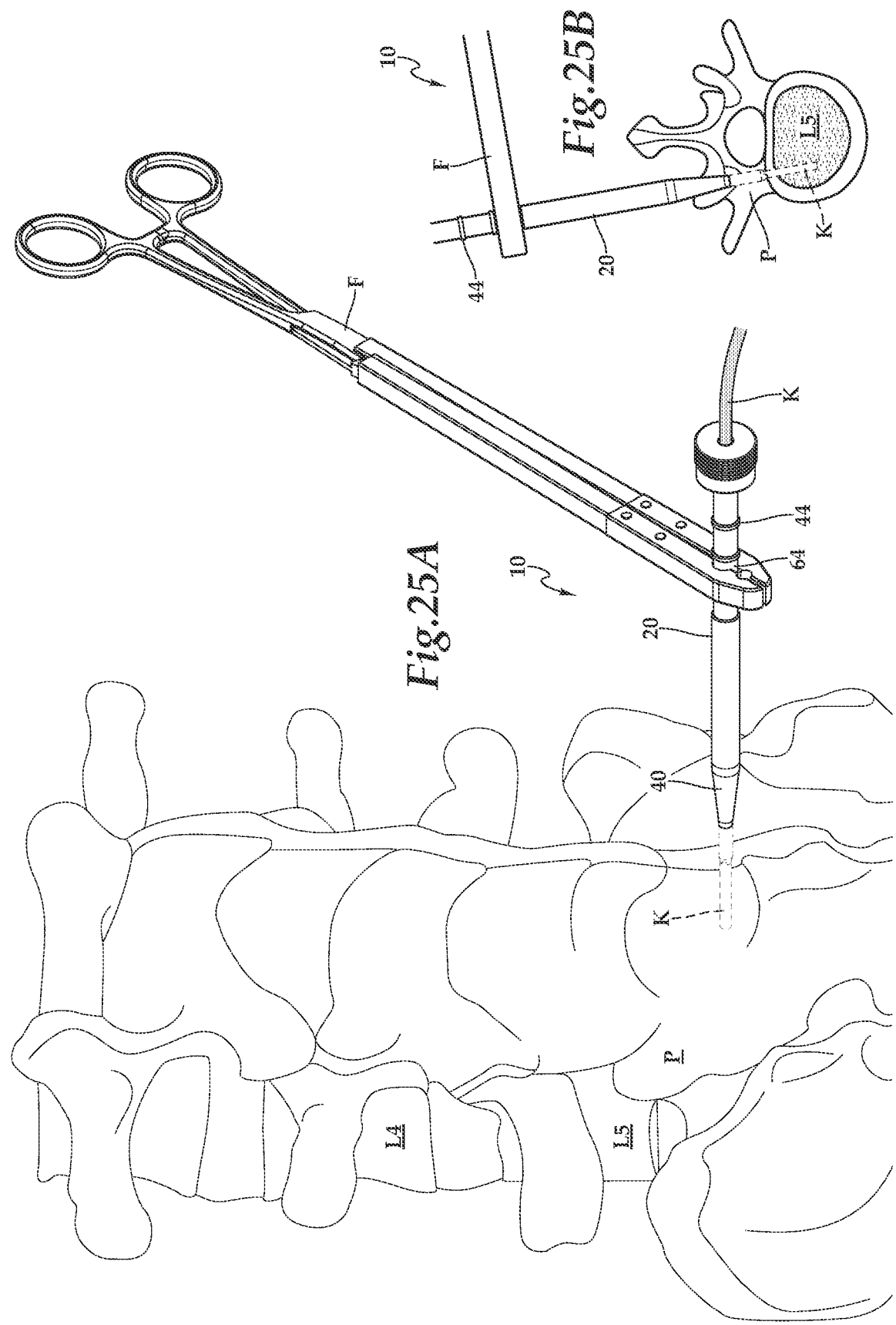
FIG. 25A is a front perspective view of one operational implementation of the minimally invasive spinal instrument being used in a third phase of the minimally invasive spinal targeting procedure shown in FIG. 23.
FIG. 25B is a top elevation view of one operational implementation of the minimally invasive spinal instrument being used in the third phase of the minimally invasive spinal targeting procedure shown in FIG. 25A.
Figure 26:
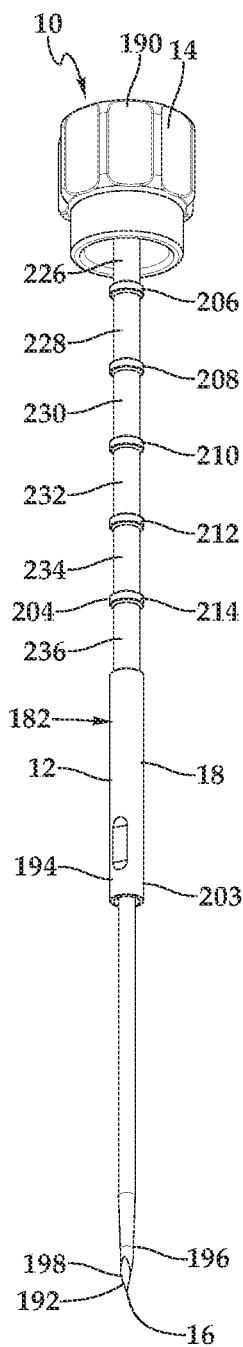
FIG. 26 is a perspective view from a distal angle of another embodiment of an inner shaft, according to some teachings presented herein.
Figure 27:
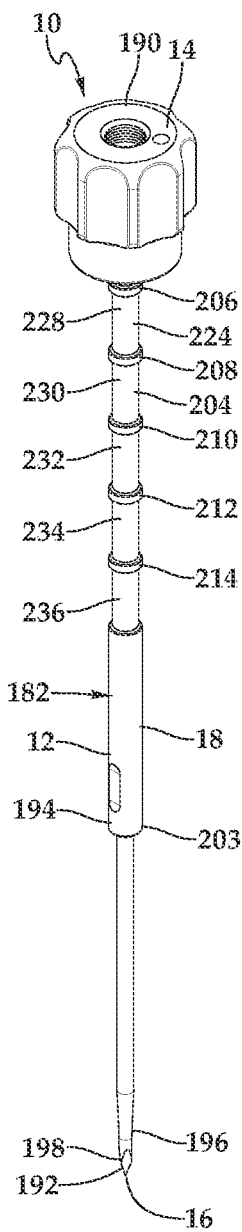
FIG. 27 is a perspective view from a proximal angle of the inner shaft presented in FIG. 26.
Figure 28:
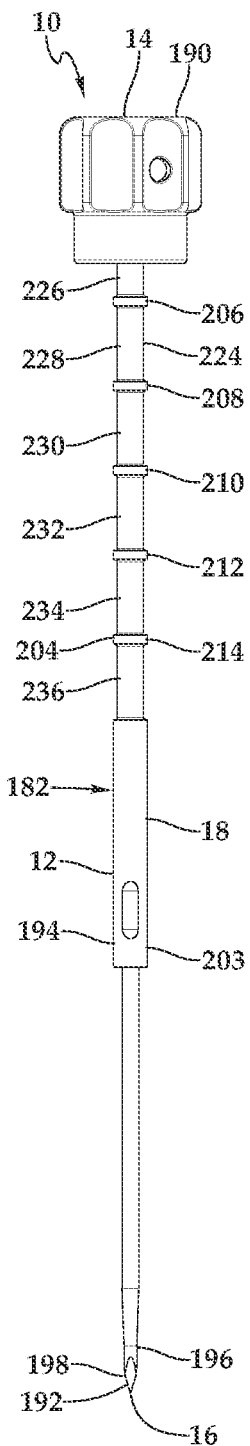
FIG. 28 is a lateral view from a first viewpoint of the inner shaft presented in FIG. 26.
Figure 29:
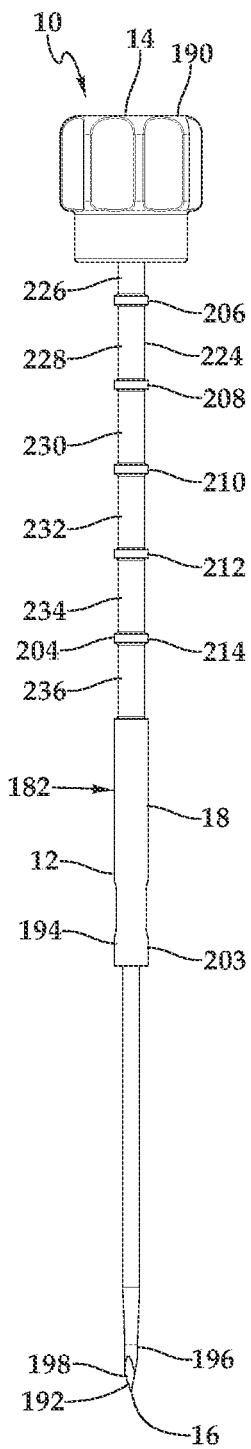
FIG. 29 is a lateral view from a second viewpoint of the inner shaft presented in FIG. 26.
Figure 30:
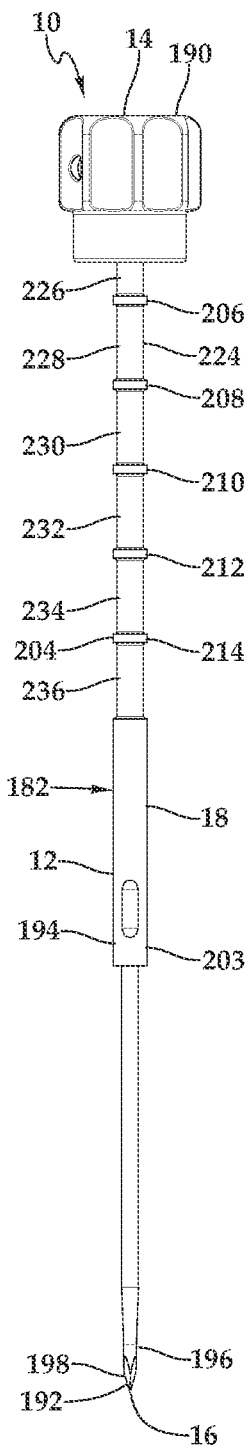
FIG. 30 is a lateral view from a third viewpoint of the inner shaft presented in FIG. 26.
Figure 31:
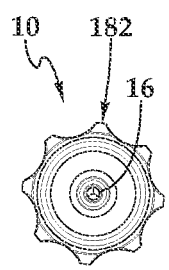
FIG. 31 is a distal view of the inner shaft presented in FIG. 26.
Figure 32:
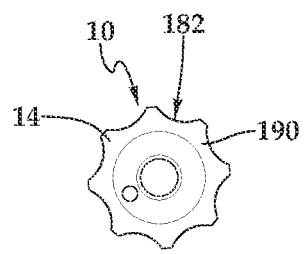
FIG. 32 is a proximal view of the inner shaft presented in FIG. 26.

After additional mallet strikes, once the tip 96 of the minimally invasive spinal instrument 10 properly traverses the pedicle P, a K-wire K serving as a guidewire needs to be advanced into the vertebral body. As shown in FIG. 24, the tapered end 40 of the outer shaft 20 is docketed into the hole made by the tip 96. As the Kocher forceps F hold the minimally invasive spinal instrument 10, the locking knob 150 is selectively disengaged from the outer shaft 20 such that the inner shaft 22 and the locking knob 150 are separated from the outer shaft 20. The K-wire is then advanced through the passageway 34 of the outer shaft 20 into the pedicles and vertebral bodies, as shown in FIGS. 25A and 25B. Additionally, imaging, such as lateral fluoroscopy, may then be utilized to confirm K-wire depth and direction parallel to the superior end plates. After the K-wire K is tapped and imaging confirms proper positioning, pedicle screws may be placed. During the procedure and the imaging, the minimally invasive spinal instrument 10 is positioned in a controlled and stable manner that permits the surgeon's hand and forearm to be clear of the imaging line-of-sight, thereby mitigating or eliminating low levels of radiation exposure. When the tip of the pedicle screw reaches the posterior cortex of the vertebral body through the pedicle), the K-wire K may be pulled out, and any necessary directional changes may be made to adjust the placement of the pedicle screw and successful placement of the pedicle screw fixation system may continue.

Referring now to FIG. 26 through FIG. 32, as previously alluded, various embodiments and modifications are within the teachings presented herein. By way of example and not by way of limitation, the inner shaft may vary in size to accommodate patients of different dimensions. An inner shaft 182 is sized to be at least partially enclosed within the passageway of the outer shaft 20. The inner shaft includes ends 190, 192 with the end 190 being positioned at the proximal end region 14 of the body 12 and the end 192 being positioned at the distal end region 16. The inner shaft 182 includes a receiving member 194 at the end 192 within the distal end region 16 of the body 12. The receiving member 194 may be sized to interface with a tip 196, which may be a tip capable of making a tap hole in a bone, for example, as part of a minimally invasive spinal targeting technique and screw placement at the lumbar spine, which may form a portion of a pedicle screw fixation system. In one embodiment, the tip 196 may be a trocar tip 198 of the type including an awl and a cannula. In one implementation, the receiving member 194 includes threads (not shown) for receiving, in threaded engagement, the tip 196 thereat, which may include threads (not shown). Although threads are presented, it should be appreciated that other connection techniques are within and included in the teachings presented herein.

With respect to the medial region 18, the inner shaft 182 includes a barreled surface 203, which may be adjacent the receiving member 194. The barreled surface 203 provides an ergonomic interface for handling the minimally invasive spinal instrument 10. With respect to the proximal end region 14 and the medial region 18, the inner shaft 182 includes spaced rings 204, which include individual spaced rings 206, 208, 210, 212, 214. Also, between the proximal end region 14 and the medial region 18, the inner shaft 182 includes locking grooves 224 interleaved with the spaced rings 204. More particular, the locking grooves 224 include individual locking grooves 226, 228, 230, 232, 234, 236. As will be discussed in further detail hereinbelow, the locking grooves 224 are sized to accept a clamp such that the spaced rings 204 mitigate longitudinal sliding of the clamp. As previously mentioned, by way of example and not by way of limitation, the clamp may be forceps or Kocher forceps. At the end 190 in the proximal end region 14, the inner shaft 182 includes threads (not shown).

The order of execution or performance of the methods and process flows illustrated and described herein is not essential, unless otherwise specified. That is, elements of the methods and process flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system comprising a clamp and a minimally invasive spinal instrument for use with the clamp and a hammer, the minimally invasive spinal instrument comprising:
a body having a longitudinal axis with a proximal end region, a distal end region, and a medial region therebetween, the body having an outer shaft and an inner shaft;
the outer shaft having a passageway therethrough from the proximal end region to the distal end region, the passageway including an opening proximate the proximal end region, the passageway sized to accept a metallic wire therethrough, the outer shaft having a continuous, imperforate lateral wall extending from the proximal end region to the distal end region, wherein the outer shaft is free from any lateral or side opening;
the passageway sized to accept the inner shaft such that the outer shaft at least partially encloses the inner shaft, the passageway being a cannulated bore dimensioned to slidingly receive the inner shaft and to pass a guidewire;
the outer shaft having a tapered end at the distal end region;
the outer shaft having a first plurality of spaced rings between the proximal end region and the medial region;
a plurality of locking grooves interleaved with the first plurality of spaced rings, the spaced rings and interleaved locking grooves forming clamp-retention features configured to receive jaws of the clamp and to mitigate longitudinal sliding of the clamp;
the inner shaft having a second plurality of spaced rings between the proximal end region and the medial region;
a locking knob selectively secured to the proximal end region, the locking knob having a body with a striking face and a connection face, the striking face accepting a strike from the hammer, the connection face having a central set of threads configured to threadably engage the inner shaft, the connection face having a peripheral set of threads configured to threadably engage the outer shaft, the peripheral set of threads being radially and longitudinally offset from the central set of threads; and
a tip removably secured to the inner shaft at the distal end region.

2. The system as recited in claim 1, further comprising a single shaft configuration wherein, in response to the locking knob being selectively disengaged from the outer shaft, the inner shaft and the locking knob are separated from the outer shaft.

3. The system as recited in claim 1, further comprising:
a single shaft configuration wherein the inner shaft and the locking knob are separated from the outer shaft; and
the opening of the passageway being accessible.

4. The system as recited in claim 1, wherein the clamp further comprises Kocher forceps.

5. The system as recited in claim 1, further comprising a second plurality of locking grooves interleaved with the second plurality of spaced rings.

6. The system as recited in claim 5, wherein the second plurality of locking grooves accept the clamp.

7. The system as recited in claim 5, wherein the second plurality of locking grooves accept the clamp such that the second plurality of spaced rings mitigate longitudinal sliding of the clamp.

8. The system as recited in claim 1, wherein the outer shaft fully encloses the inner shaft.

9. The system as recited in claim 1, wherein the body of the locking knob further comprises a shoulder that spatially separates the central set of threads and the peripheral set of threads.

10. The system as recited in claim 1, wherein the peripheral set of threads are positioned distally to the central set of threads.

11. The system as recited in claim 1, wherein the hammer further comprises a mallet.

12. The system as recited in claim 1, wherein the tip is threadably secured to the inner shaft.

13. The system as recited in claim 1, wherein the tip further comprises a trocar tip, the trocar tip including an awl and a cannula.

14. The system as recited in claim 1, wherein the metallic wire further comprises a Kirschner wire (K-wire).

15. A system comprising a clamp and a minimally invasive spinal instrument for use with the clamp and a hammer, the minimally invasive spinal instrument comprising:

a body having a longitudinal axis with a proximal end region, a distal end region, and a medial region therebetween, the body having an outer shaft and an inner shaft;

the outer shaft having a passageway therethrough from the proximal end region to the distal end region, the passageway including an opening proximate the proximal end region, the passageway sized to accept a metallic wire therethrough, the outer shaft having a continuous, imperforate lateral wall extending from the proximal end region to the distal end region, wherein the outer shaft is free from any lateral or side opening;

the passageway sized to accept the inner shaft such that the outer shaft at least partially encloses the inner shaft, the passageway being a cannulated bore dimensioned to slidingly receive the inner shaft and to pass a guidewire;

the outer shaft having a tapered end at the distal end region;

the outer shaft having a first plurality of spaced rings between the proximal end region and the medial region;

a plurality of locking grooves interleaved with the first plurality of spaced rings, the spaced rings and interleaved locking grooves forming clamp-retention features configured to receive jaws of the clamp and to mitigate longitudinal sliding of the clamp;

the inner shaft having a second plurality of spaced rings between the proximal end region and the medial region;

a locking knob selectively secured to the proximal end region, the locking knob having a body with a striking face and a connection face, the striking face accepting a strike from the hammer, the connection face having a central set of threads configured to threadably engage the inner shaft, the connection face having a peripheral set of threads configured to threadably engage the outer shaft, the peripheral set of threads being radially and longitudinally offset from the central set of threads;

a tip removably secured to the inner shaft at the distal end region; and a single shaft configuration wherein, in response to the locking knob being selectively disengaged from the outer shaft, the inner shaft and the locking knob are separated from the outer shaft such that the opening to the passageway is accessible to accept the metallic wire therethrough.

16. A system comprising a clamp and a minimally invasive spinal instrument, the minimally invasive spinal instrument comprising:

a body having a longitudinal axis with a proximal end region, a distal end region, and a medial region therebetween, the body having an outer shaft and an inner shaft;

the outer shaft having a passageway therethrough from the proximal end region to the distal end region, the passageway including an opening proximate the proximal end region, the passageway sized to accept a metallic wire therethrough, the outer shaft having a continuous, imperforate lateral wall extending from the proximal end region to the distal end region, wherein the outer shaft is free from any lateral or side opening;

the passageway sized to accept the inner shaft such that the outer shaft at least partially encloses the inner shaft, the passageway being a cannulated bore dimensioned to slidingly receive the inner shaft and to pass a guidewire;

the outer shaft having a tapered end at the distal end region;

the outer shaft having a first plurality of spaced rings between the proximal end region and the medial region, the outer shaft having a first plurality of locking grooves interleaved with the first plurality of spaced rings, the first plurality of locking grooves being sized to accept the clamp such that the first plurality of spaced rings mitigate longitudinal sliding of the clamp;

the inner shaft having a second plurality of spaced rings between the proximal end region and the medial region, the inner shaft having a second plurality of locking grooves interleaved with the second plurality of spaced rings, wherein the spaced rings and interleaved locking grooves on the outer shaft form clamp-retention features configured to receive jaws of the clamp and to mitigate longitudinal sliding of the clamp;

a locking knob selectively secured to the proximal end region, the locking knob having a body with a striking face and a connection face, the striking face sized to accept a strike from a hammer, the connection face having a central set of threads configured to threadably engage the inner shaft, the connection face having a peripheral set of threads configured to threadably engage the outer shaft, the peripheral set of threads being radially and longitudinally offset from the central set of threads;

a tip removably secured to the inner shaft at the distal end region; and a single shaft configuration wherein, in response to the locking knob being selectively disengaged from the outer shaft, the inner shaft and the locking knob are separated from the outer shaft such that the opening to the passageway is accessible to accept the metallic wire therethrough.

\* \* \* \* \*